United States Patent
Murai et al.

(10) Patent No.: US 7,389,378 B2
(45) Date of Patent: Jun. 17, 2008

(54) WRITE PROCESSING METHOD FOR STREAM TYPE COMMANDS AND MEDIUM STORAGE APPARATUS

(75) Inventors: Hiroaki Murai, Kawasaki (JP); Yoshinori Inoue, Kawasaki (JP); Satoru Fukase, Kawasaki (JP); Takehiro Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 736 days.

(21) Appl. No.: 10/789,304

(22) Filed: Feb. 27, 2004

(65) Prior Publication Data

US 2004/0225710 A1 Nov. 11, 2004

(30) Foreign Application Priority Data

May 9, 2003 (JP) .............................. 2003-131859

(51) Int. Cl.
*G06F 12/00* (2006.01)
(52) U.S. Cl. .............................. 711/111; 360/75; 714/8; 714/16; 369/53.15
(58) Field of Classification Search ................. 711/111
See application file for complete search history.

(56) References Cited

U.S. PATENT DOCUMENTS

| | | | | |
|---|---|---|---|---|
| 5,689,487 | A | 11/1997 | Iwanaga | 369/54 |
| 6,038,619 | A * | 3/2000 | Berning et al. | 710/33 |
| 6,341,109 | B1 | 1/2002 | Kayanuma | 369/47.14 |
| 6,490,691 | B1 * | 12/2002 | Kimura et al. | 714/8 |
| 6,697,902 | B1 * | 2/2004 | Sugimoto | 710/305 |
| 6,697,977 | B2 * | 2/2004 | Ozaki | 714/710 |
| 7,082,494 | B1 * | 7/2006 | Thelin et al. | 711/112 |
| 2002/0168180 | A1 * | 11/2002 | Tol et al. | 386/113 |
| 2003/0031106 | A1 * | 2/2003 | Ozaki | 369/53.17 |
| 2004/0100712 | A1 * | 5/2004 | Drouin | 360/55 |
| 2004/0210711 | A1 * | 10/2004 | Kakihara et al. | 711/112 |
| 2004/0264030 | A1 * | 12/2004 | Yang | 360/69 |
| 2005/0078395 | A1 * | 4/2005 | Chu et al. | 360/48 |

FOREIGN PATENT DOCUMENTS

| | | |
|---|---|---|
| JP | 08-129454 | 5/1996 |
| JP | 09-161416 | 6/1997 |
| JP | 2001-155303 | 6/2001 |

* cited by examiner

*Primary Examiner*—Tuan V. Thai
*Assistant Examiner*—Ryan Dare
(74) *Attorney, Agent, or Firm*—Greer, Burns & Crain, Ltd.

(57) ABSTRACT

A medium storage apparatus writes data for stream type commands on a medium, and improves the reliability of the write data while maintaining the execution time of the commands. The apparatus has a buffer for storing the write data of the write stream type commands, a controller for sequentially writing the data of the buffer to the medium by a head, and a processing unit for skipping the writing of erred sectors for continuing the processing which normally ends if an error occurs, and writing the data to the skipped sector after command execution. By this, the error is corrected such that the medium is correctly read in the next and later read processing, while maintaining the write time specified by the command.

18 Claims, 9 Drawing Sheets

| 1F7 | 1F6 | 1F5 | 1F4 | 1F3 | 1F2 | 1F1 |
|---|---|---|---|---|---|---|
| Command Register | Device/Head Register | Cylinder High (LBA High) Register | Cylinder Low (LBA Mid) Register | Sector Number (LBA Low) Register | Sector Count Register | Features Register |

12A

1F1

| bit | 7 | 6 | 5 | 4 | 3 | 2 | 1 | 0 |
|---|---|---|---|---|---|---|---|---|
| TITLE | URG | WC | ... | ... | ... | ... | ... | ... |

| Command | START LBA | Sector Count | Protect bit |
|---|---|---|---|
| 0x3B | 0x1000 | 0x0100 | 0 |
| 0x3B | 0x2000 | 0x0200 | 0 |
| 0x3B | 0x0001 | 0x000C | 1 |
| 0x3B | 0x000D | 0x0010 | 1 |
| : | : | : | : |
| | | | |

13B

| Command No. | START LBA | Sector Count | Buffer Address | Protect bit |
|---|---|---|---|---|
| 0xFF | 0xFFFFFFFF | 0x0000 | 0xFFFFFFFF | 1 |
| 0xFF | 0xFFFFFFFF | 0x0000 | 0xFFFFFFFF | 1 |
| 0xFF | 0xFFFFFFFF | 0x0000 | 0xFFFFFFFF | 1 |
| 0xFF | 0xFFFFFFFF | 0x0000 | 0xFFFFFFFF | 1 |
| : | : | : | : | : |
| | | | | |

| |
|---|
| Buffer Address 0x0000 : LBA 1 |
| Buffer Address 0x0200 : LBA 2 |
| Buffer Address 0x0400 : LBA 3 |
| Buffer Address 0x0600 : LBA 4 |
| Buffer Address 0x0800 : LBA 5 |
| Buffer Address 0x0A00 : LBA 6 |
| Buffer Address 0x0C00 : LBA 7 |
| Buffer Address 0x0E00 : LBA 8 |
| Buffer Address 0x1000 : LBA 9 |
| Buffer Address 0x1200 : LBA 10 |
| Buffer Address 0x1400 : LBA 11 |
| Buffer Address 0x1600 : LBA 12 |
| : |
| : |

FIG. 11

|      | 1F7  | 1F6  | 1F5  | 1F4  | 1F3  | 1F2  | 1F1  |
|------|------|------|------|------|------|------|------|
| No.0 | 0x3B | 0xE0 | 0x00 | 0x10 | 0x00 | 0x80 | 0x80 |
| No.1 | 0x3B | 0xE0 | 0x00 | 0x20 | 0x00 | 0xFF | 0x80 |
| No.2 | 0x3B | 0xE0 | 0x00 | 0x00 | 0x01 | 0x0C | 0x80 |
| No.3 | 0x3B | 0xE0 | 0x00 | 0x00 | 0x0D | 0x10 | 0x80 |
| :    | :    | :    | :    | :    | :    | :    | :    |

FIG. 12

Command Table –WHEN EXECUTING Command No.2   13A

| Command | START LBA | Sector Count | Protect bit |
|---------|-----------|--------------|-------------|
| 0x3B    | 0x1000    | 0x0100       | 0           |
| 0x3B    | 0x2000    | 0x0200       | 0           |
| 0x3B    | 0x0001    | 0x000C       | 1           |
| 0x3B    | 0x000D    | 0x0010       | 1           |
| :       | :         | :            | :           |
|         |           |              |             |

↓ ↓

Command Table –AFTER EXECUTED Command No.2   13A

| Command | START LBA | Sector Count | Protect bit |
|---------|-----------|--------------|-------------|
| 0x3B    | 0x1000    | 0x0080       | 0           |
| 0x3B    | 0x2000    | 0x00FF       | 0           |
| 0x3B    | 0x0001    | 0x000C       | 0           |
| 0x3B    | 0x000D    | 0x0010       | 0           |
| :       | :         | :            | :           |
|         |           |              |             |

FIG. 13

Protect Table –WHEN EXECUTING Command No.2      13B

| Command No. | START LBA  | Sector Count | Buffer Address | Protect bit |
|-------------|------------|--------------|----------------|-------------|
| 0xFF        | 0xFFFFFFFF | 0x0000       | 0xFFFFFFFF     | 1           |
| 0xFF        | 0xFFFFFFFF | 0x0000       | 0xFFFFFFFF     | 1           |
| 0xFF        | 0xFFFFFFFF | 0x0000       | 0xFFFFFFFF     | 1           |
| 0xFF        | 0xFFFFFFFF | 0x0000       | 0xFFFFFFFF     | 1           |
| :           | :          | :            | :              | :           |
|             |            |              |                |             |

↓ ↓

Protect Table –AFTER EXECUTED Command No.2      13B

| Command No. | START LBA  | Sector Count | Buffer Address | Protect bit |
|-------------|------------|--------------|----------------|-------------|
| 0x3B        | 0x00000005 | 0x0006       | 0x00000000     | 1           |
| 0xFF        | 0xFFFFFFFF | 0x0000       | 0xFFFFFFFF     | 1           |
| 0xFF        | 0xFFFFFFFF | 0x0000       | 0xFFFFFFFF     | 1           |
| 0xFF        | 0xFFFFFFFF | 0x0000       | 0xFFFFFFFF     | 1           |
| :           | :          | :            | :              | :           |
|             |            |              |                |             |

WRITE PROCESSING METHOD FOR STREAM TYPE COMMANDS AND MEDIUM STORAGE APPARATUS

CROSS-REFERENCE TO RELATED APPLICATIONS

This application is based upon and claims the benefit of priority from the prior Japanese Patent Application No. 2003-131859, filed on May 9, 2003, the entire contents of which are incorporated herein by reference.

BACKGROUND OF THE INVENTION

1. Field of the Invention

The present invention relates to a write processing method for stream type commands and a medium storage apparatus for writing data on the medium in accordance with stream type commands, and more particularly to a write processing method for stream type commands and a medium storage apparatus for writing data continuously within a specified time.

2. Description of the Related Art

Because of the recent advancements in data processing technology, the processing of moving pictures, music and voice is becoming possible. Because of this, data storage apparatus has begun to be used to store such data. For this application, stream type commands, such as Read Stream/Write Stream, are provided.

A stream type command is primarily used for AV (Audio Visual). Therefore priority is assigned to performance (speed) rather than to the original reliability of the data storage apparatus (e.g. magnetic disk apparatus).

In a conventional data storage apparatus, if a write error is generated when data is written to the medium, normally a retry is performed and a read/write is attempted until the threshold is reached. In the case of a stream type command, where the requesting unit continuously transmits data, however, if an error occurs, processing including a retry must be completed within a specified time. Therefore conventionally, if a write error occurs, the command is terminated as an error.

However, there are some cases where such an error termination is not preferable as the application of data storage apparatus expands. For example, in the case of real-time picture recording and sound recording, a re-transmission cannot be expected even if the command is terminated as an error.

Also in some cases, sectors, where data cannot be correctly written to the medium, may be existed, and such sectors cannot be used even if they are read.

SUMMARY OF THE INVENTION

With the foregoing in view, it is an object of the present invention to provide a write processing method for stream type commands and a medium storage apparatus for writing correct data without terminating the command as an error, and with maintaining the execution time, even if a write error occurs during a data write by the stream type commands.

It is another object of the present invention to provide a write processing method for stream type commands and a medium storage apparatus for reading data correctly when data is read, without terminating as an error, and with maintaining the execution time, even if a write error occurs during a data write by the stream type commands.

To achieve these objects, a write processing for stream type commands of the present invention for writing write data to a storage medium by a head according to the stream type commands includes steps of: writing received write data of the stream type commands to a buffer; writing the write data of the buffer sequentially to the storage medium by the head while confirming whether the writing succeeded; skipping sectors where the writing did not succeed when the writing did not succeed in the write step, and protecting the write data in the sectors where the writing did not succeed on the buffer; and writing the write data of the protected sector to the storage medium by the head after the stream type commands are executed.

The medium storage apparatus of the present invention for writing data to a storage medium by a head includes: a buffer for storing write data received along with stream type commands; a controller for sequentially writing the write data of the buffer to the storage medium by the head; and a processing unit for confirming whether the writing succeeded, and skipping sectors where the writing did not succeed and protecting the write data of the sector where the writing did not succeed on the buffer when the writing did not succeed. And the processing unit writes the write data of the protected sectors to the storage medium by the head after executing the stream type commands.

According to the present invention, with the write stream type commands, writing to error sectors is skipped so that processing, which normally ends if an error occurs, is continued, and skipped sectors are written after command execution, so the error is corrected such that the medium is correctly read in the next and later read processing, while maintaining the write time specified by the command.

It is preferable that the present invention further includes a step of restarting the write processing of the head after stopping the write processing to the storage medium when the writing did not succeed. By this, the error status of the head can be recovered and writing can be continued.

In the present invention, it is preferable that the protect step includes a step of protecting the write data of the sector where the writing did not succeed and the sector for which writing was skipped until restart. By this, even if writing is stopped and then the writing is restarted, the write data for which writing was skipped can be protected.

In the present invention, it is preferable that the step of writing the data of the protected sector includes a step of enabling a predetermined number of times of retries when the writing of the write data did not succeed. By this, writing becomes more certain since the retry is enabled.

In the present invention, it is preferable that the protect step further includes a step of storing the sector where the writing did not succeed, and the address of the buffer of the write data of the sector in a protect table. Because of recording to a protect table, the sector for which writing was skipped can be recognized later, even when the write processing is continued.

Also in the present invention, it is preferable that the step of writing the write data of the protected sector includes a step of writing the write data of the buffer in reference to the protect table. By this, the sector for which writing was skipped can be written easily.

Also in the present invention, it is preferable that the protect step includes a step of calculating a shortest start sector in terms of the time up to the restart after the write processing is stopped, and a step of protecting the write data of the sector where the writing did not succeed and the sector for which writing was skipped up to the restart obtained from the calculation result. By this, the sector for which writing was skipped can be easily detected.

Also in the present invention, it is preferable that the storage medium is a rotating disk medium. By this, the present invention can be applied to a large capacity medium.

Also in the present invention, it is preferable that the protect step includes a step of recognizing that the command is a stream type command and executing the protection when the writing did not succeed. By this, the write processing for a stream type command can be executed using a normal write processing routine.

BRIEF DESCRIPTION OF THE DRAWINGS

FIG. 5 shows a detailed configuration of the table in FIG. 4;

FIG. 6 is a diagram depicting the data buffer in FIG. 1;

FIG. 11 is a diagram depicting an example of the stream type write commands in the processing in FIG. 7 to FIG. 9;

FIG. 12 shows the command table of the stream type commands example in FIG. 11; and FIG. 13 shows a protect table of the stream type write commands example in FIG. 11.

DESCRIPTION OF THE PREFERRED EMBODIMENTS

Embodiments of the present invention will now be described in the sequence of medium storage apparatus, data write processing of stream type commands, and other embodiments.

[Medium Storage Apparatus]

Figure 1:
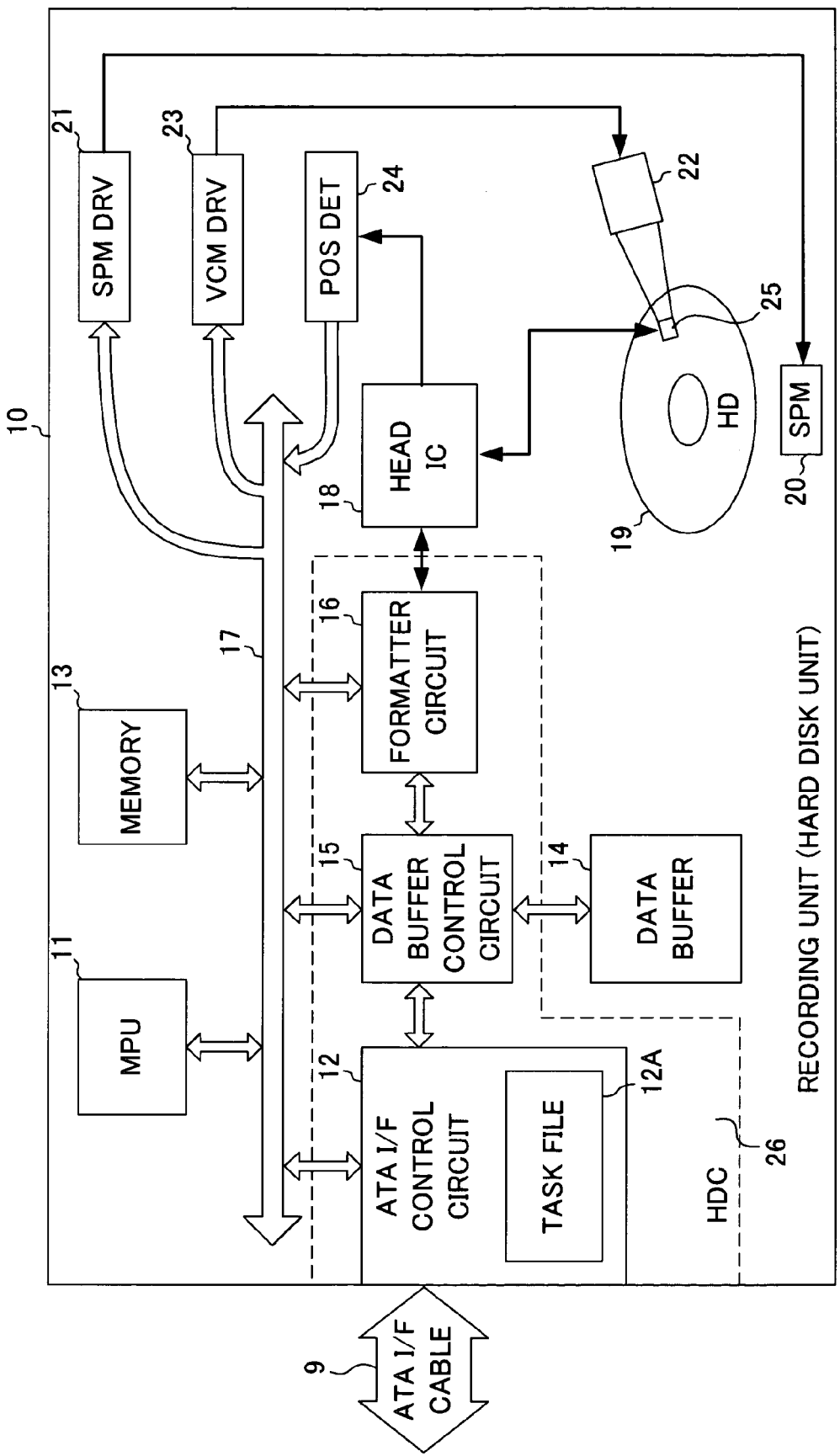
FIG. 1 is a block diagram depicting the medium storage apparatus according to an embodiment of the present invention.
Figures 2, 3, 4:
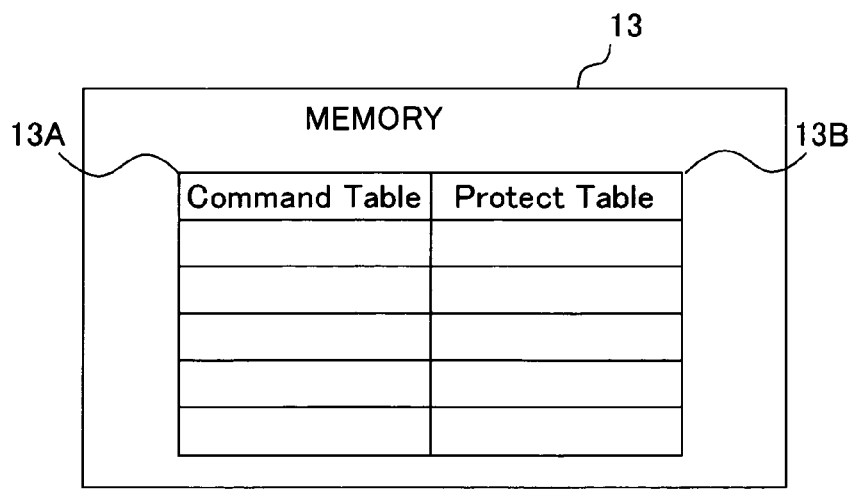
FIG. 2 is a diagram depicting a task file in FIG. 1.
FIG. 3 is a diagram depicting a feature register in FIG. 2.
FIG. 4 shows the table of the memory in FIG. 1.

FIG. 1 is a block diagram depicting the medium storage apparatus according to an embodiment of the present invention, FIG. 2 is a diagram depicting a task file in FIG. 1, FIG. 3 is a diagram depicting a feature register in FIG. 2, FIG. 4 shows the table of the memory in FIG. 1, FIG. 5 shows the configuration of the table in FIG. 4, and FIG. 6 is a diagram depicting the data buffer in FIG. 1.

FIG. 1 shows a magnetic disk apparatus (HDD) for reading/writing data from/to the magnetic disk as a medium storage apparatus. The magnetic disk apparatus 10 is connected with a host, such as a personal computer, via an ATA (AT Attachment) standard interface cable 9.

The magnetic disk apparatus 10 is comprised of a magnetic disk 19, a spindle motor 20 for rotating the magnetic disk 19, a magnetic head 25 for reading/writing data from/to the magnetic disk 19, and an actuator (VCM) for moving the magnetic head 25 in the radius direction (track crossing direction) of the magnetic disk 19.

The control section is comprised of an HDC (Hard Disk Controller) 26, data buffer 14, MPU 11, memory 13, head IC 18, spindle motor driver 21, VCM driver 23, position detection section 24, and a bus 17 which connects all these components.

The HDC 26 is further comprised of an ATA interface control circuit 12 which has a task file 12A for setting a task from the host, data buffer control circuit 15 for controlling the data buffer 14, and a format control circuit 16 for controlling the format of the recording data.

The head IC 18 supplies recording current to the magnetic head 25 according to the recording data when writing, or amplifies the read signal from the magnetic head 25 and outputs the read data (including servo information) when reading. The position detection section 24 detects the position of the magnetic head 25 using the servo information from the head IC 18.

The spindle driver 21 drives the rotation of the spindle motor 20. The VCM driver 23 drives the VCM 22 for moving the magnetic head 25. The MPU (Micro-Processor) 11 performs position control of the magnetic head 25, read/write control, and retry control. And the memory 13 stores tables and data required for processing of the MPU 11.

FIG. 2 is a diagram depicting the ATA standard task file (register) 12A in FIG. 1, where the command string (task) from the host is set. In the command register 1F7, commands such as read and write commands are set. The start address is set in the apparatus/head register 1F6, and in the cylinder high, low and sector number registers 1F5-1F3. The number of sectors for read/write is set in the sector count register 1F2.

In the feature register 1F1, the mode of read or write is specified. As FIG. 3 shows, bit 7 of the 8-bit feature register 1F1 is the URGENT (URG) bit, and bit 6 is the WRITE CONTINUE (WC) bit. The URG bit specifies urgent processing, and this specifies, for example, to inhibit retry and to execute write operation in the case of a write command. The WC bit specifies to continue writing and specifies a write mode where only several times of retry is enabled.

In the present embodiment, a stream type command is specified by specifying the URG bit or the WC bit.

FIG. 4 shows a table which is set for the memory 13 in FIG. 1, FIG. 5 shows a configuration of the table in FIG. 4, and FIG. 6 is a diagram depicting the data buffer 14 in FIG. 1. As FIG. 4 shows, the command table 13A and the protect table 13B are created in the memory 13.

As FIG. 6 shows, in the data buffer 14, write data from the host or read data to the host are stored at each buffer address position in LBA units.

As FIG. 5 shows, the command table 13A stores the command received from the host, the start LBA (Logical Block Address), the sector count and the later mentioned protect bit. The protect table 13B stores the command number- to be protected, the start LBA of the area to be protected in the data buffer 14 in FIG. 6, the sector count number to be protected, the address of the data buffer 14 and the protect bit.

[Data Write Processing of Stream Type Commands]

Figure 7:
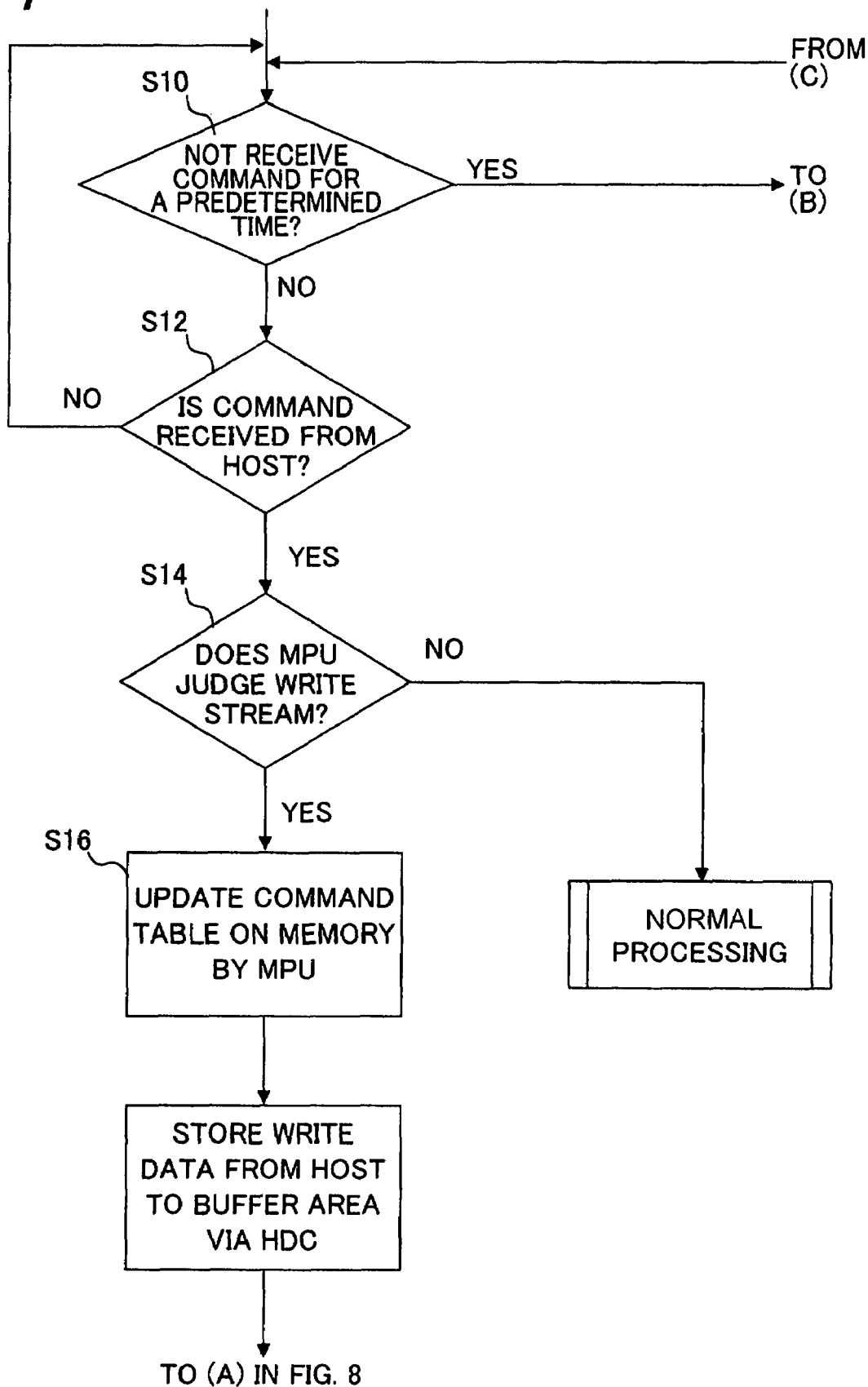
FIG. 7 is a flow chart depicting write processing according to an embodiment of the present-invention (No. 1)
Figure 8:
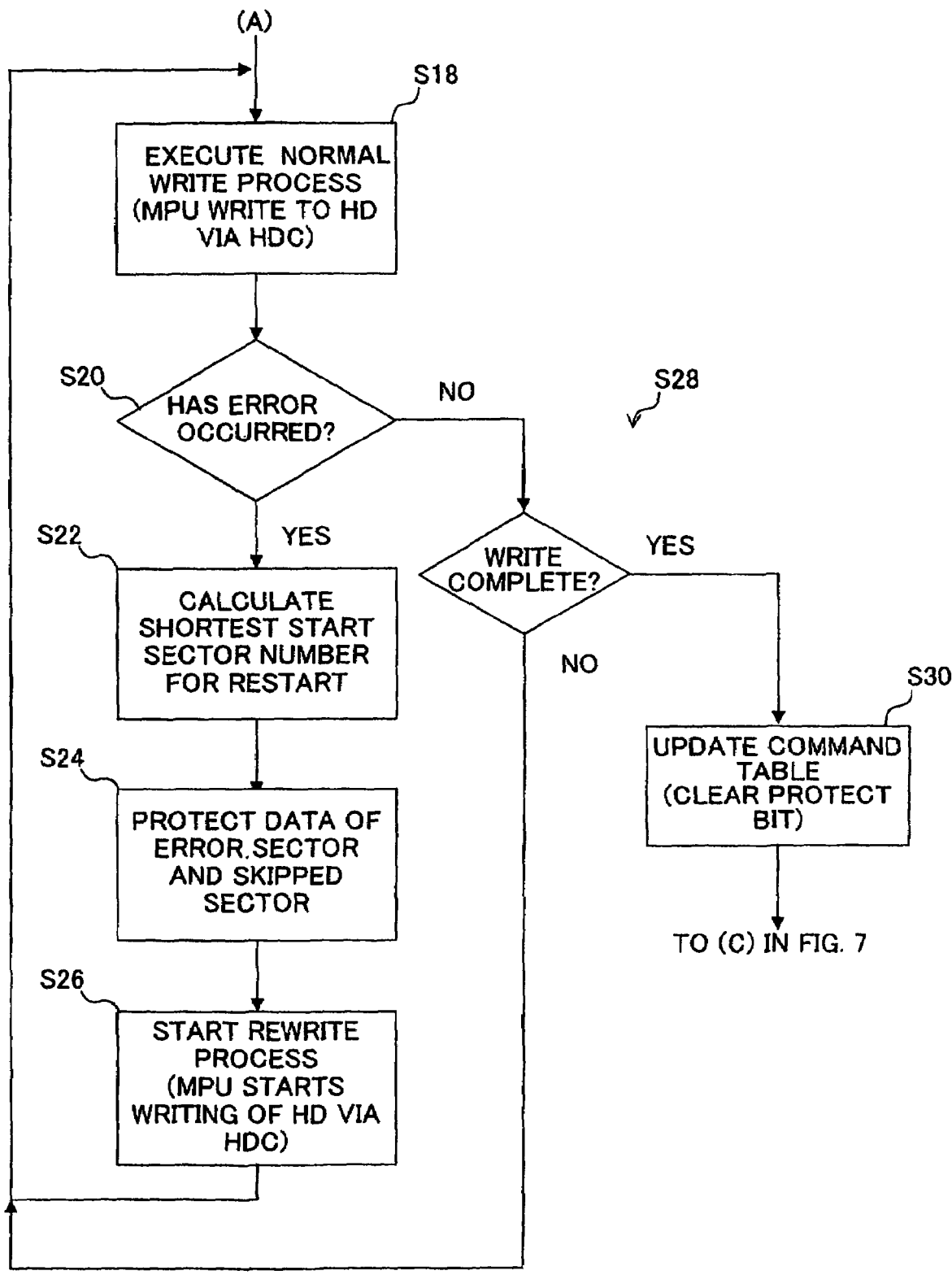
FIG. 8 is a flow chart depicting write processing according to an embodiment of the present invention (No. 2)

Now data write processing when a stream type command is received in the above mentioned configuration will be described using the processing flow charts in FIG. 7 to FIG. 9.

(S10) The MPU 11 judges whether a command from the host via HDC 26 is not received for a predetermined time. When no command is received from the host for a predetermined time, processing advances to step S32 in FIG. 9.

(S12) The MPU 11 judges whether the HDC 26 received a command from the host. If the command is not received, processing returns to step S10.

(S14) When the MPU 11 receives a command via the HDC 26, the MPU 11 analyzes the command code and sends an instruction corresponding to the command to the HDC 26. In other words, when the MPU 11 judges that this command is not a Write Stream PIO (Port Input/Output) command by the command code analysis, the MPU 11 sends normal processing to the HDC 26. In the normal processing, importance is placed on the reliability of the data, so a predetermined number of times of retries is performed for the read/write error regardless the time, so that reliability of the data is guaranteed.

(S16) When the MPU 11 judges that the command is a Write Stream PIO command, the MPU 11 updates the command table 13A on the memory 13 according to the command which is set in the task file 12A of the HDC 26 (see FIG. 2). The write data which is sent from the host is stored to the data buffer 14 (see FIG. 6) via the HDC 26 (ATA interface control circuit 12, buffer control circuit 15).

(S18). Then the MPU 11 instructs the operation of the Write Stream PIO command to the HDC 26. By this, the buffer control circuit 15 of the HDC 26 drives the magnetic head 25 via the format circuit 16 and the head IC 18 by the received write data on the data buffer 14, and writes the received write data on the buffer 14 to the magnetic disk 19.

(S20) The MPU 11 detects the decoded position from the position detection section 24, drives the VCM 22 via the VCM driver 23, and controls the position of the magnetic head 25 to the specified track. The MPU 11 also judges whether the magnetic head has deviated from the track center in a predetermined range (off track error) using the decoded position.

(S22) When the MPU 11 judges that a write error, such as an off track error, occurred, the MPU 11 stops the medium write processing of the HDC 26 at that point (at the point when the write error occurred). Since the command at this time is with an URG bit (Urgent bit) in the feature register 1F1 (see FIG. 3), the MPU 11 does not attempt a retry, and calculates the shortest start LBA in terms of time up to restart. In other words, even if the write operation is stopped due to a write error, the magnetic disk 19 is rotating, so the predetermined number of sectors (LBA) cannot be written until restart (return of the magnetic head 25 to the track center by VCM 22 and confirmation thereof).

(S24) The MPU 11 updates the protect table 13B (see FIG. 4) on the memory 13. In other words, the MPU 11 adds to the protect table 13B the start LBA which could not be written, the sector count number which could not be written, calculated from the shortest start LBA mentioned above, the buffer addresses thereof in the buffer 14 and the protect bit (protective flag). In other words, data on the erred sectors and the sectors for which writing was skipped up to restart are protected.

Figure 10:
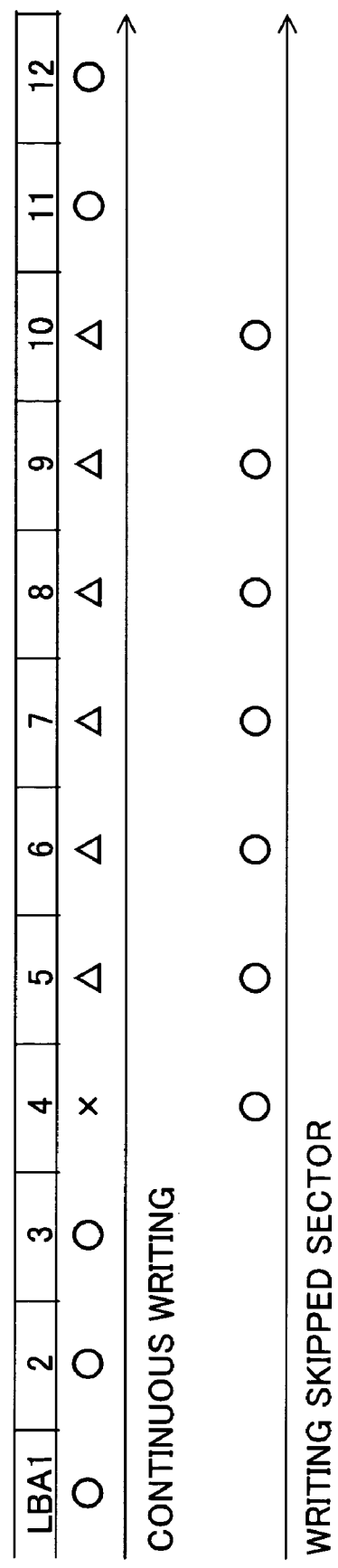
FIG. 10 is a diagram depicting the operation of processing in FIG. 7 to FIG. 9.

(S26) If MPU 11 calculated that restart from LBA 11 is possible, as described later in FIG. 10, the MPU 11 starts medium write processing to the HDC 26 again from the LBA 11, without performing any processing for LAB 5-10. And processing returns to step S18. In FIG. 10, a write error is detected at LBA 4, so LBAs which could not be written or have not yet been written are LBA 4-LBA 10.

(S28) If a write error is not detected in step S20, the MPU 11 judges whether a command end notice was received from the HDC 26. If there is no command end notice, processing returns to step S18.

(S30) When a command end notice is received from the HDC 26, the MPU 11 updates the command table 13A (see FIG. 5) on the memory 13. In other words, the protect bit of the command table 13A is changed from "1" to "0". And processing returns to step S10 in FIG. 7. After this, the MPU 11 does not use buffer area of the buffer addresses 0x0600-0x13FF, even if a new command is issued from the host, because the buffer addresses 0x0600-0x13FF (see FIG. 6) on the buffer 14 which stores data are protected by the protect table 13B (see FIG. 5).

(S32) On the other hand, it is judged in step S10 whether the host did not issue a command for a while after this. For example, it is judged whether a command was not issued for one minute. If a command was not issued for a predetermined time, the MPU 11 instructs the medium write processing again to the HDC 26 based on the protect table 13B (see FIG. 5) on the memory 13. Since this is not a command issued by the host, the HDC 26 performs a full retry, attempting to complete the medium writing as much as possible. In other words, when the MPU 11 judges that a write error, such as an off track error, occurred, the MPU 11 stops medium write processing to the HDC 26 at that point (at the point when the write error occurred), and attempts retry.

(S34) Then the MPU 11 judges whether a retry out occurred (error continues after a predetermined number of retries).

(S36) If a retry out did not occur, that is if the medium writing completed, the MPU 11 receives a write completion from the HDC 26. When the write completion is received, the MPU 11 ends the medium write processing via the HDC, and updates the protect table 13B in FIG. 5. In other words, the MPU 11 clears the executed protect table 13B, and returns to the command reception wait status, which is a normal sequence in step S10.

(S38) If medium writing failed in step S34 even after a full retry, the MPU 11 gives up writing the LBA and moves to writing the next LBA. For example, if a full retry medium writing to the LBA 4 failed, the MPU 11 gives up writing the LBA 4 and moves to a full retry medium writing for the next LBA 5. If it is judged that the writing has not been completed in step S36, the MPU 11 moves to writing the next LBA. And processing returns to step S32.

Figure 9:
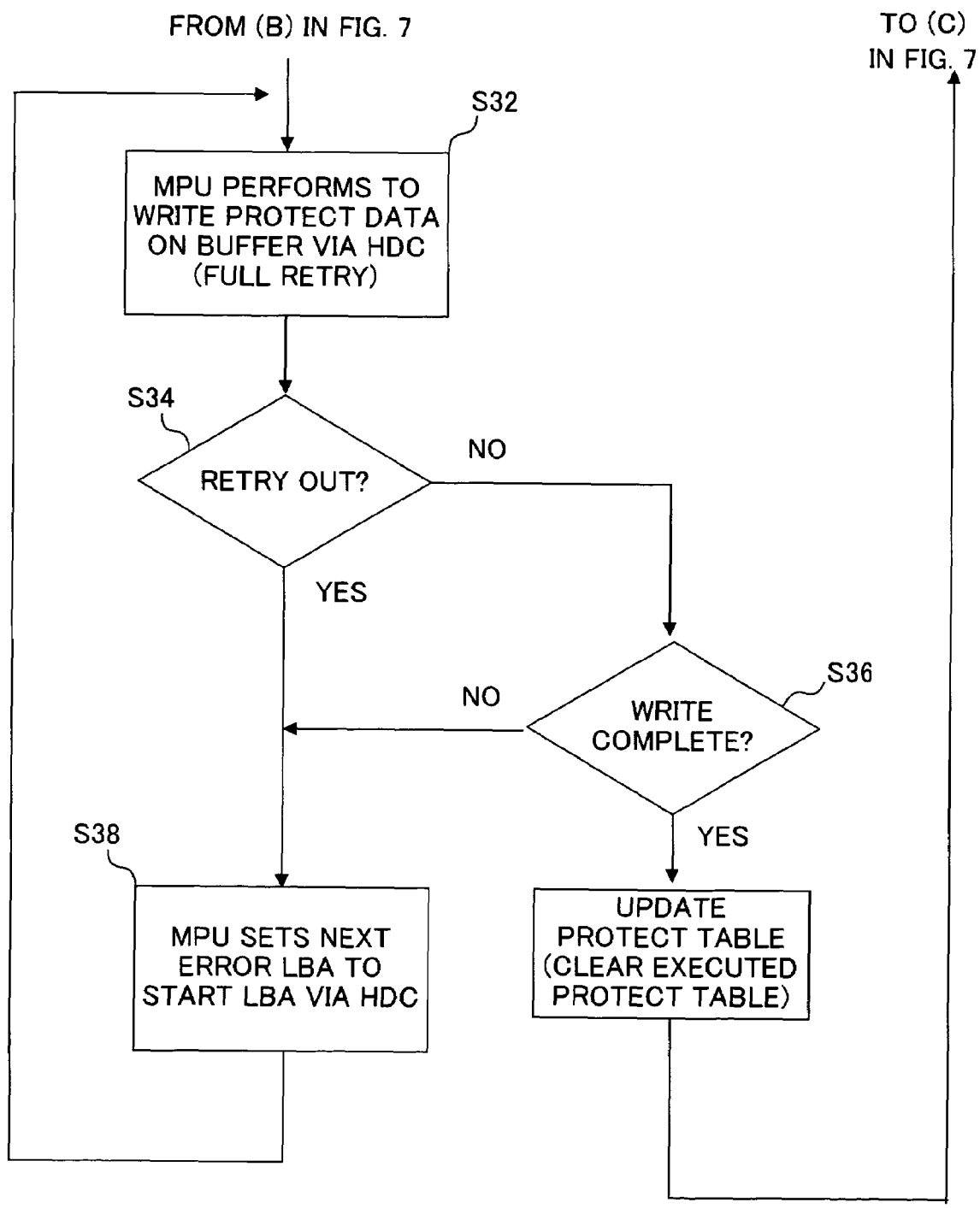
FIG. 9 is a flow chart depicting write processing according to an embodiment of the present invention (No. 3)

In other words, in the flow in FIG. 9, the steps from S32 to S38 are repeated for the number of the sector count written in the protect table 13B. When all these steps are completed, the protect table 13B in FIG. 5 is updated and the protection of the buffer data 14 is cleared. When the next and later commands are received, the MPU 11 performs operation for using the buffer addresses 0x0600-0x13FF (see FIG. 6).

This will be described in detail using a specific example with reference to FIG. 10 to FIG. 13. It is assumed that the commands (No. 0, No. 1 . . . ) are issued from the host in the command sequence shown in FIG. 11. In this case, the MPU 11 updates the command table 13A on the memory 13 (see FIG. 12).

The write data sent from the host is stored to the buffer 14 via the HDC 26, as shown in FIG. 6. The MPU 11 judges this as a Write Stream PIO, and instructs this information to the HDC 26, and the HDC 26 writes the received write data on the buffer 14 to the medium 19.

The commands No. 0 and No. 1 in FIG. 11 are written to the medium without problem, and the normal end status is returned to the host. If a write error (e.g. off track error) occurs to the No. 2 command thereafter, the HDC 26 stops the medium write processing at that point (at the point when the write error occurred). The command this time is an URG bit (Urgent bit) in the feature register, so a retry is not attempted and the MPU 11 calculates the shortest start LBA in terms of time up to restart.

The MPU 11 updates the protect table 13B on the memory 13, as shown in FIG. 13. In other words, as the protect table 13B at the bottom of FIG. 13 shows, the start LBA which could not be written, the sector count, the buffer address and the protect bit are added.

As FIG. 10 shows, if the write error is detected at LBA 4 and the MPU 11 calculated that restart is possible from LBA 11, then nothing is executed (writing is skipped) for LBA 5 to LBA 10, and the medium writing is started from the LBA 11 via the HDC. In this case, LBAs which could not actually be written or have not yet been written are LBA 4 to LBA 10 in FIG. 10.

When the command ends, the MPU 11 updates the command table 13A on the memory 13, and changes the protect bit from "1" to "0" (see FIG. 12). Then the buffer area on which the protect bit is changed are protected by the protect table 13B (see FIG. 13) so that the buffer addresses 0x0600 to 0x13FF on the buffer 14 (FIG. 6), which stores the data, are not used even if a new command is issued by the host.

If the host does not issue a command for a while after this, for example does not issue a command for one minute, the MPU 11 performs medium write processing again for the buffer data in FIG. 6, which has been protected up to this point, based on the protect table 13B (see FIG. 13) on the memory 13. In this case, a command was not issued by the host, so a fully retry is attempted, so as to complete the medium writing as much as possible.

If the medium writing succeeded at this point, the MPU 11 ends the medium write processing via the HDC, updates the protect table 13B in FIG. 13, and returns to command reception wait status, which is a normal sequence.

If medium write still fails after the full retry, the MPU 11 gives up writing the LBA and moves to writing the next LBA. For example, if the full retry medium writing to LBA 4 failed, the MPU 11 gives up writing LBA 4, and moves to a full retry medium writing for the next LBA 5.

This step is repeated for the number of sector counts written in the protect table 13B (see FIG. 13). When all these steps are completed, the MPU 11 updates the protect table 13B in FIG. 13, and clears the protection of the buffer data (FIG. 6). When the protect table 13B becomes this status, the MPU 11 performs operation using the buffer addresses 0x0600-0x13FF (FIG. 6) when the next and later commands are received.

In this way, according to the present invention, processing which ends normally if an error occurs can be continued in the Write Stream related commands, and the error can be corrected such that the medium is correctly read in the next or later read processing.

Also when no command is issued from the host for a predetermined time, the sectors for which writing was skipped are written, so writing can be executed without using the host. Also the protect table is created, and sectors for which writing was skipped are stored and are protected on the buffer, so the loss of data from the buffer is prevented, and write processing can be executed for certain after a command ends.

In rewriting after a command ends, a full retry is possible, so the writing of sectors for which writing was skipped becomes more certain.

[Other Embodiments]

In the above embodiments, the medium was described using a magnetic disk, but the present invention can be applied to other storage media, such as optical disks and magneto-optical disks. The write error was described as an off track error, but the present invention can be applied to other write errors. And the interface is not limited to an ATA, but may be other interfaces.

Moreover, as described in the example of the Urgent bit, the above embodiments can be achieved likewise also in the WRITE CONTINUE bit which affords for several retries. Furthermore, a protect area may be provided separately in the buffer to copy the protected data.

The present invention was described using embodiments, but the present invention can be modified in various forms within the scope of the essential character of the present invention, which shall not be excluded from the scope of the present invention.

In this way, according to the present invention, for the Write Stream commands, processing which ends normally if an error occurs is continued with skipping the writing of the erred sectors, and the data of the erred sectors is protected and the sectors, for which writing was skipped, are written after command execution. So the error can be corrected such that the medium is correctly read in the next and later read processing while maintaining the write time specified by the command.

What is claimed is:

1. A write processing method for stream type commands for writing write data to a storage medium by a head according to the stream type command, comprising the steps of:
    writing received write data of said stream type commands to a buffer;
    writing the write data of said buffer sequentially to sectors of said storage medium by said head while confirming whether the writing succeeded;
    skipping a sector where said writing did not succeed in said writing step;
    protecting the write data for the sector where writing did not succeed in said buffer; and
    retry writing the write data of said skipped sector protected in said buffer to said skipped sector after said stream type commands are executed.

2. The write processing method for stream type commands according to claim 1, further comprising a step of restarting the write processing of said head after stopping the write processing to said storage medium when said writing to said skipped sector did not succeed.

3. The write processing method for stream type commands according to claim 2, wherein said protecting step further comprises a step of protecting the write data of at least one subsequent sector for which writing was skipped after stopping the write processing until said restarting of the write processing.

4. The write processing method for stream type commands according to claim 1, wherein said step of retry writing the write data of said skipped sector comprises a step of enabling a predetermined number of times of retries to said skipped sector.

5. The write processing method for stream type commands according to claim 1, wherein said protecting step further comprises a step of storing a count number of said skipped sector and the address of said buffer of the write data of said skipped sector in a protect table.

6. The write processing method for stream type commands according to claim 5, wherein the step of writing the write data of said skipped sector comprises a step of writing the write data of said buffer in reference to said protect table.

7. The write processing method for stream type commands according to claim 3, wherein said protecting step further comprises:
   a step of calculating a number of said at least one subsequent sector in terms of the time up to said restart after said write processing is stopped; and
   a step of protecting the write data of said at least one subsequent sector where writing was skipped up to said restart obtained from said calculation result.

8. The write processing method for stream type commands according to claim 1, wherein said storage medium comprises a rotating disk medium.

9. The write processing method for stream type commands according to claim 1, wherein said protecting step further comprises a step of recognizing that said command is said stream type command and executing said protecting step when said writing did not succeed.

10. A medium storage apparatus for writing data to a storage medium by a head comprising:
    a buffer for storing write data received along with stream type commands;
    a controller for sequentially writing the write data of said buffer to sectors of said storage medium by said head; and
    a processing unit for confirming whether said writing succeeded, skipping a sector where said writing did not succeeds and protecting the write data of said skipped sector in said buffer when said writing did not succeed, wherein said processing unit retries writing the write data of said skipped sector to said skipped sector by said head after executing said stream type commands.

11. The medium storage apparatus according to claim 10, wherein when said writing did not succeed, said processing unit restarts writing the write data by said head after the writing to said storage medium is stopped.

12. The medium storage apparatus according to claim 11, wherein said processing unit protects the write data of at least one subsequent sector for which writing was skipped after stopping the writing until the restart of the writing.

13. The medium storage apparatus according to claim 10, wherein said processing unit allows a predetermined number of retries to said skipped sector.

14. The medium storage apparatus according to claim 10, wherein said processing unit stores a count number of said skipped sector and the address of said buffer of the write data of said skipped sector in a protect table.

15. The medium storage apparatus according to claim 14, wherein said processing unit writes the write data of said buffer in reference to said protect table.

16. The medium storage apparatus according to claim 12, wherein said processing unit calculates a number of said at least of subsequent sector in terms of the time up to said restart after said writing is stopped, and protects the write data of the sector where said writing did not succeed and the at least one subsequent sector for which writing was skipped up to said restart obtained from said calculation result.

17. The medium storage apparatus according to claim 10, wherein said storage medium is a rotating disk medium.

18. The medium storage apparatus according to claim 10, wherein said processing unit recognizes that said command is said stream type command.

* * * * *

UNITED STATES PATENT AND TRADEMARK OFFICE
CERTIFICATE OF CORRECTION

PATENT NO. : 7,389,378 B2
APPLICATION NO. : 10/789304
DATED : June 17, 2008
INVENTOR(S) : Hiroaki Murai It is certified that error appears in the above-identified patent and that said Letters Patent is hereby corrected as shown below:

<u>In the Claims</u>:

Col. 9, line 29, delete "succeeds" and insert --succeed--.

Signed and Sealed this

Fourteenth Day of October, 2008

JON W. DUDAS
*Director of the United States Patent and Trademark Office*